(12) United States Patent  (10) Patent No.: US 7,192,047 B2
Sauermann  (45) Date of Patent: Mar. 20, 2007

(54) TRAILER COUPLING FOR A VEHICLE

(76) Inventor: Hans Sauermann, Hohenwarter Strasse 29, Freinhausen (DE) D-86558

( * ) Notice: Subject to any disclaimer, the term of this patent is extended or adjusted under 35 U.S.C. 154(b) by 0 days.

(21) Appl. No.: 11/107,653

(22) Filed: Apr. 14, 2005

(65) Prior Publication Data

US 2005/0230935 A1    Oct. 20, 2005

(30) Foreign Application Priority Data

Apr. 16, 2004  (DE) .................. 20 2004 006 228 U
Oct. 1, 2004   (EP) .................................. 04023428

(51) Int. Cl.
    B60D 1/06   (2006.01)
    B60D 1/36   (2006.01)
(52) U.S. Cl. ....................... 280/509; 280/477; 280/511
(58) Field of Classification Search ................ 280/509, 280/511, 477
    See application file for complete search history.

(56) References Cited

U.S. PATENT DOCUMENTS 6,164,681 A * 12/2000 Grammer .................... 280/508

FOREIGN PATENT DOCUMENTS

WO    WO 2004071792 A1 *  8/2004

* cited by examiner

Primary Examiner—Kevin Hurley
(74) Attorney, Agent, or Firm—Epstein Drangel Bazerman & James, LLP; Robert L. Epstein

(57) ABSTRACT

A trailer coupling (1) for a vehicle, in particular a tractor, has a coupling element (6). This coupling element (6) can grasp a drawbar (4) of a trailer and is displaceable between a coupling position and a release position. The coupling element (6) is fixed on a displaceable support which is connected fixedly to a cam (9). This cam (9) can be actuated by the drawbar (4) in order to displace the coupling element (6) into the coupling position.

12 Claims, 4 Drawing Sheets

TRAILER COUPLING FOR A VEHICLE

Figure 1:
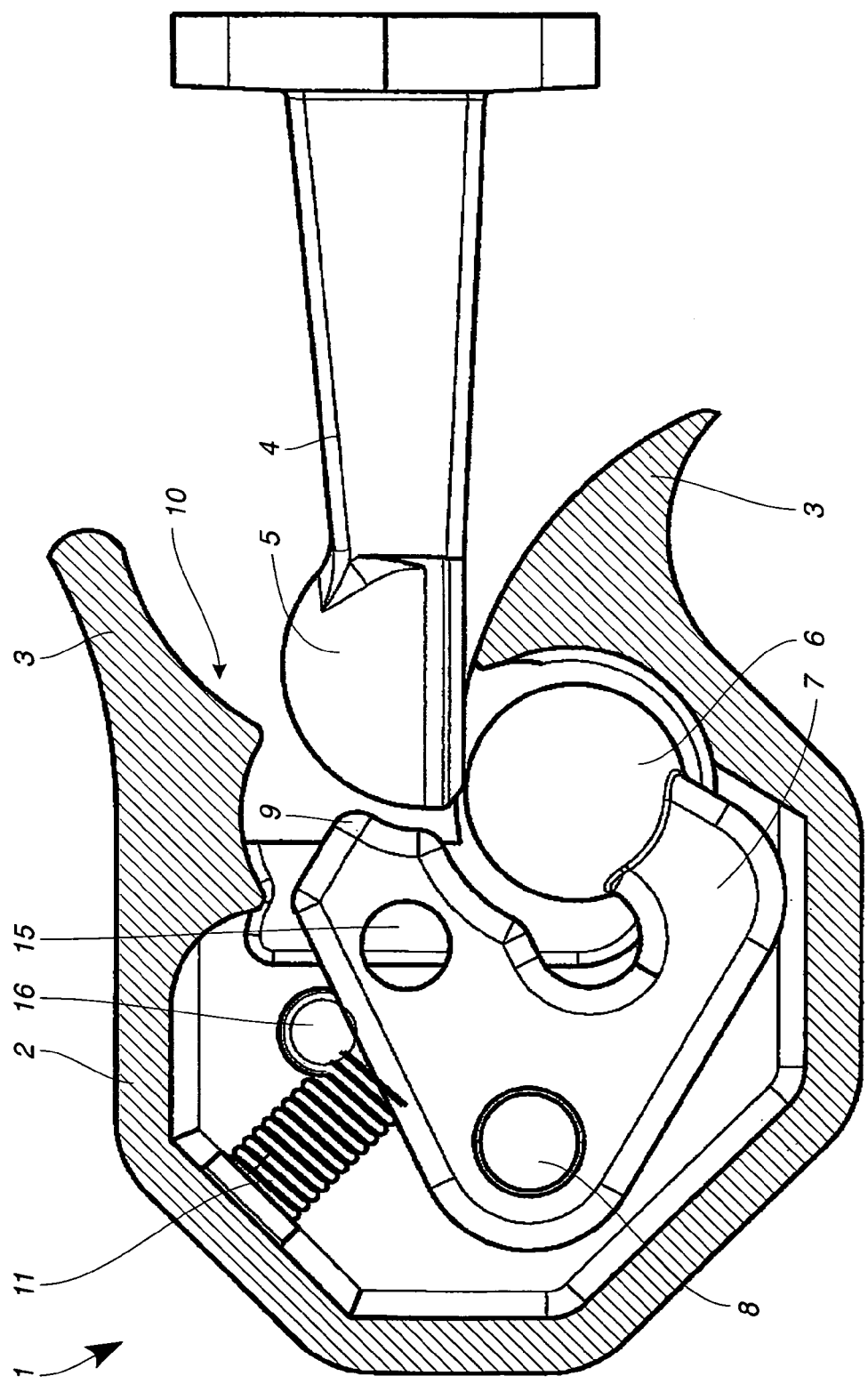

The present application claims the priority of German Patent Application No. 20 2004 006 228.3 filed Apr. 16 2004, and European Patent Application No. 04023428.8 filed Oct. 1, 2004.

The invention relates to a trailer coupling for a vehicle, in particular a tractor.

Trailer couplings which have a displaceable coupling bolt which penetrates a coupling eye in a coupling position are known in practice. In this case, complicated mechanisms are provided in order, on penetration of the coupling eye into the coupling mouth, to obtain automatic hitching.

In addition, ball-head couplings are known which comprise a ball head fixed on the vehicle and a ball socket on the trailer. These afford the advantage of greater driving comfort, particularly since they have only a very small coupling play. However, the hitching turns out to be relatively difficult.

The invention is based on the object of providing a trailer coupling of the type mentioned at the beginning which is distinguished by a simple construction and simple hitching of the trailer.

This object is achieved according to the invention by the features of patent claims 1 and 18.

In the case of the trailer coupling according to the invention, the coupling element is fixed on a displaceable support which is preferably supported displaceably in a housing. This displaceable support is fixedly connected to a cam, so that the cam, the support and the coupling element form a fixed unit. It is therefore possible for all three parts only to be displaced together. The cam is actuated by a drawbar upon its introduction into the coupling mouth, so that the support and therefore also the coupling element are displaced. The coupling element is thereby transferred by the drawbar into the coupling position. This trailer coupling is therefore capable of automatically hitching a trailer upon introduction of the drawbar into the coupling mouth, with the displacement mechanism of the coupling element being surprisingly simple. Thus, only a few components, only one of which is movable, are required for constructing the coupling. In addition, a ball head can be used very easily as the coupling element without impairing the operability of the coupling mechanism. As an alternative, a pick-up hook for grasping a drawbar eye, or a piton may also be used as the coupling element. If the coupling element is changed, the entire support is preferably replaced.

In addition, it is favorable if the support is supported pivotably preferably in a housing. For this purpose, the support has a spindle which is mounted rotatably in corresponding bearings in the housing. This measure results in a very simple construction of the trailer coupling.

In order to obtain a favorable conversion of force, it is favorable if the cam is moved essentially horizontally, particularly since the drawbar is also moved horizontally during the hitching operation. By contrast, the coupling element is to be moved essentially vertically in order to obtain an effective hitching-up to the drawbar. These two conditions are realized in the simplest manner by the support being pivotable about a horizontal axis.

To further simplify the hitching operation, it is advantageous if the support is prestressed resiliently counter to the coupling position. At the beginning of the hitching operation, the coupling element is therefore situated in a release position opening up the coupling mouth, and only by the drawbar being introduced is it displaced into the coupling position. The spring may be designed as a compression spring or a tension spring or as a torsion spring. In addition, it is conceivable to use combinations of the abovementioned spring types.

In order to obtain a secure connection of the coupling element to the drawbar during the journey, it is favorable if the support interacts with a displaceable securing pin. This securing pin retains the support in a locking position, thus preventing an inadvertent displacement of the support into the release position.

If the securing pin penetrates a depression of the support essentially from above, then a particularly space-saving construction of the trailer coupling is produced. The securing pin preferably penetrates the depression approximately above the pivot axis of the support, so that, in the region of the securing pin, the support is moved essentially perpendicularly with respect to the direction of displacement of the securing pin. This prevents the securing pin from being unintentionally displaced into a released position by the dynamic effect of the support.

In order to automatically compensate for a coupling play, it is advantageous if the securing pin or the bearing surface of the support is positioned at an acute angle with respect to the direction of displacement of the securing pin. The securing pin and the bearing surfaces form wedge surfaces via which a sensitive readjustment of the support and therefore of the coupling element can take place. This is particularly important in order to counteract wear on the coupling element or on the counterpart. The positioning angle of these wedge surfaces is preferably selected to be sufficiently small that the transmission of force by the securing pin to the support is self-locking. This ensures that the support cannot push out the securing pin during the journey, which could stop the support being retained.

In order to ensure that the securing pin is automatically transferred into the locking position, it is advantageous if the said securing pin is prestressed resiliently in the direction of the locking position.

In order to obtain increased driving comfort, it is favorable if the coupling element is formed by a ball head. This ball head is fixed on a displaceable support in order to ensure that the ball head is automatically hitched up when the drawbar is introduced.

As an alternative or in addition, it is favorable if the coupling play can be set by means of an adjusting screw. This adjusting screw is preferably provided in the housing or intercepting mouth and is displaceable toward the drawbar.

In addition, it is favorable if an intercepting mouth is supported on the support or on the housing fixed on the vehicle. This intercepting mouth ensures that the drawbar is securely trapped and therefore facilitates the hitching operation.

In order to ensure the greatest possible pivoting freedom of the coupling connection during cornering and during maneuvering, it is favorable if the intercepting mouth is held pivotably about an approximately vertical axis. This prevents the trailer drawbar, in particular during maneuvering, from butting against the intercepting mouth and thereby restricting the freedom of movement of the coupling connection.

In order, despite the pivotable mounting of the intercepting mouth, to ensure that the trailer drawbar is trapped in an accurate manner, it is advantageous if interacting guide surfaces are provided on the intercepting mouth and on the support. These guide surfaces are preferably designed as wedge surfaces and, during the transfer of the support into the release position, force the intercepting mouth into a neutral position. In this neutral position, the intercepting mouth is preferably oriented symmetrically with respect to the vehicle. Since the intercepting mouth is no longer pivotable in this position of the support, it can optimally guide the trailer drawbar to the coupling element. Only after the support has been transferred into the coupling position is the pivotability of the intercepting mouth released in order to again enable sufficient pivotability of the trailer drawbar with respect to the towing vehicle. In this position, however, the intercepting mouth is no longer required for trapping the trailer drawbar.

Further advantages and features of the present invention are presented in the following, detailed description with reference to the associated figures, in which a plurality of exemplary embodiments of the present invention are contained. However, it should be understood that the drawing serves only for the purpose of illustrating the invention and does not restrict the extent of protection of the invention.

Figure 2:
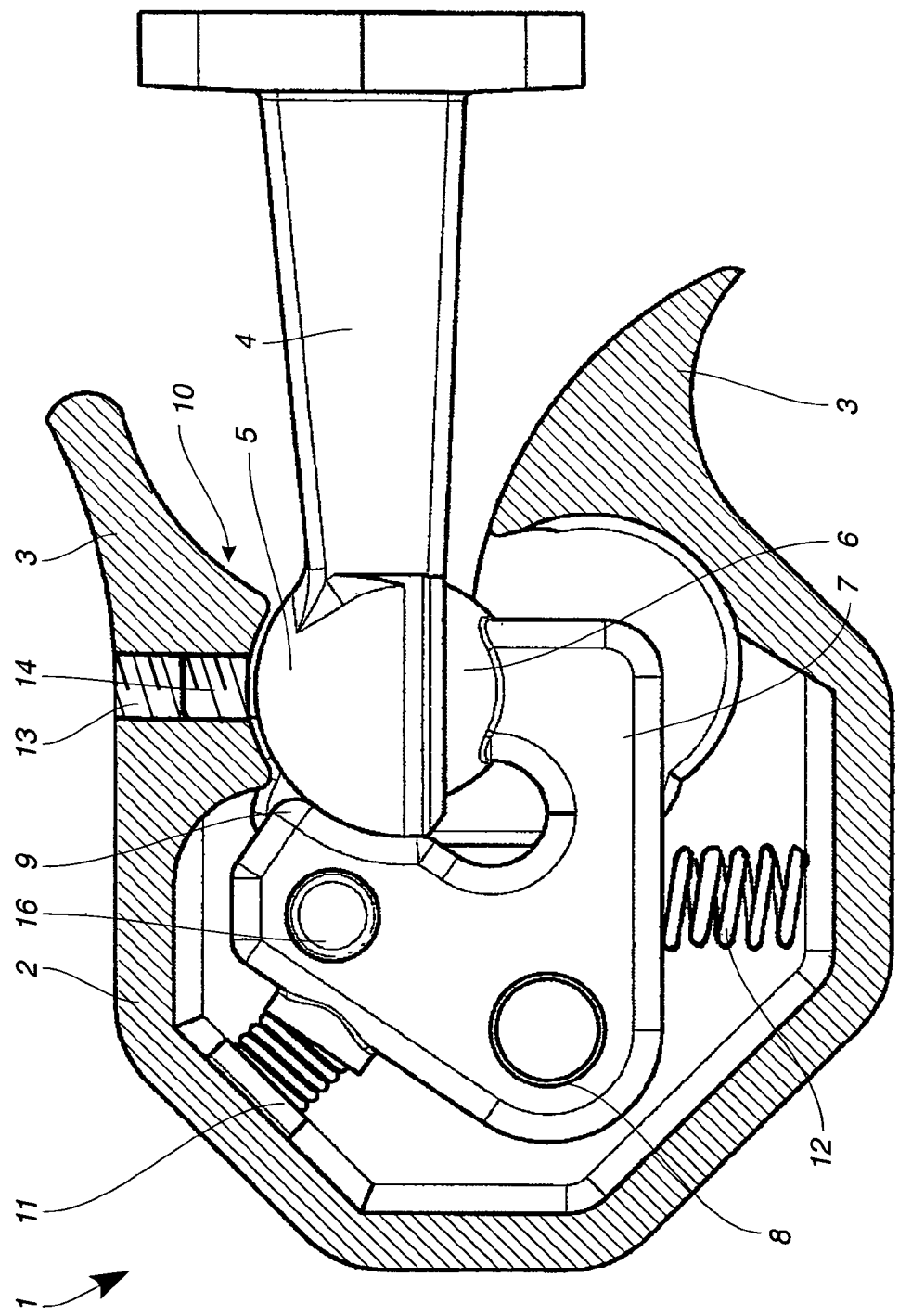
Figure 3:
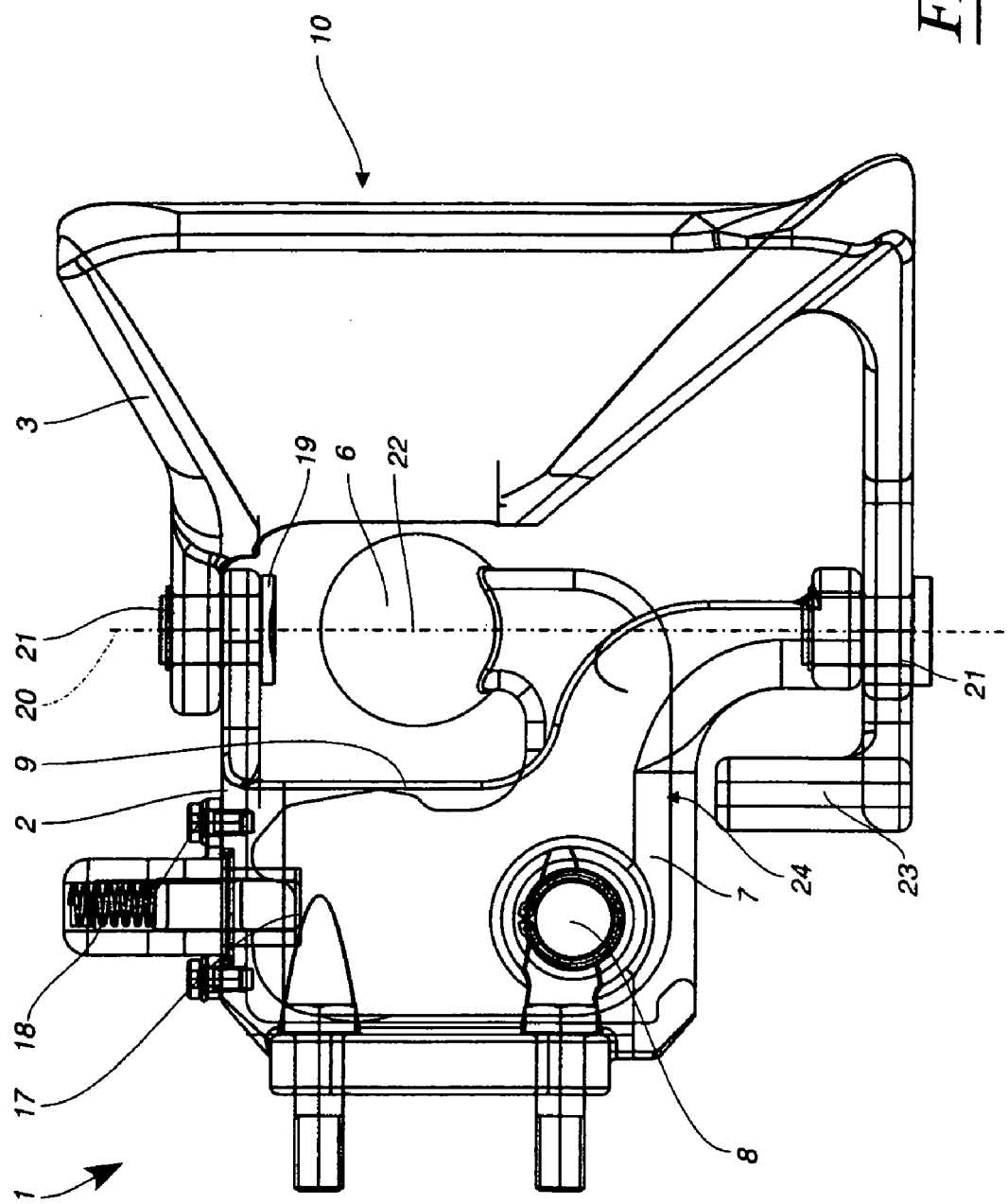
Figure 4:
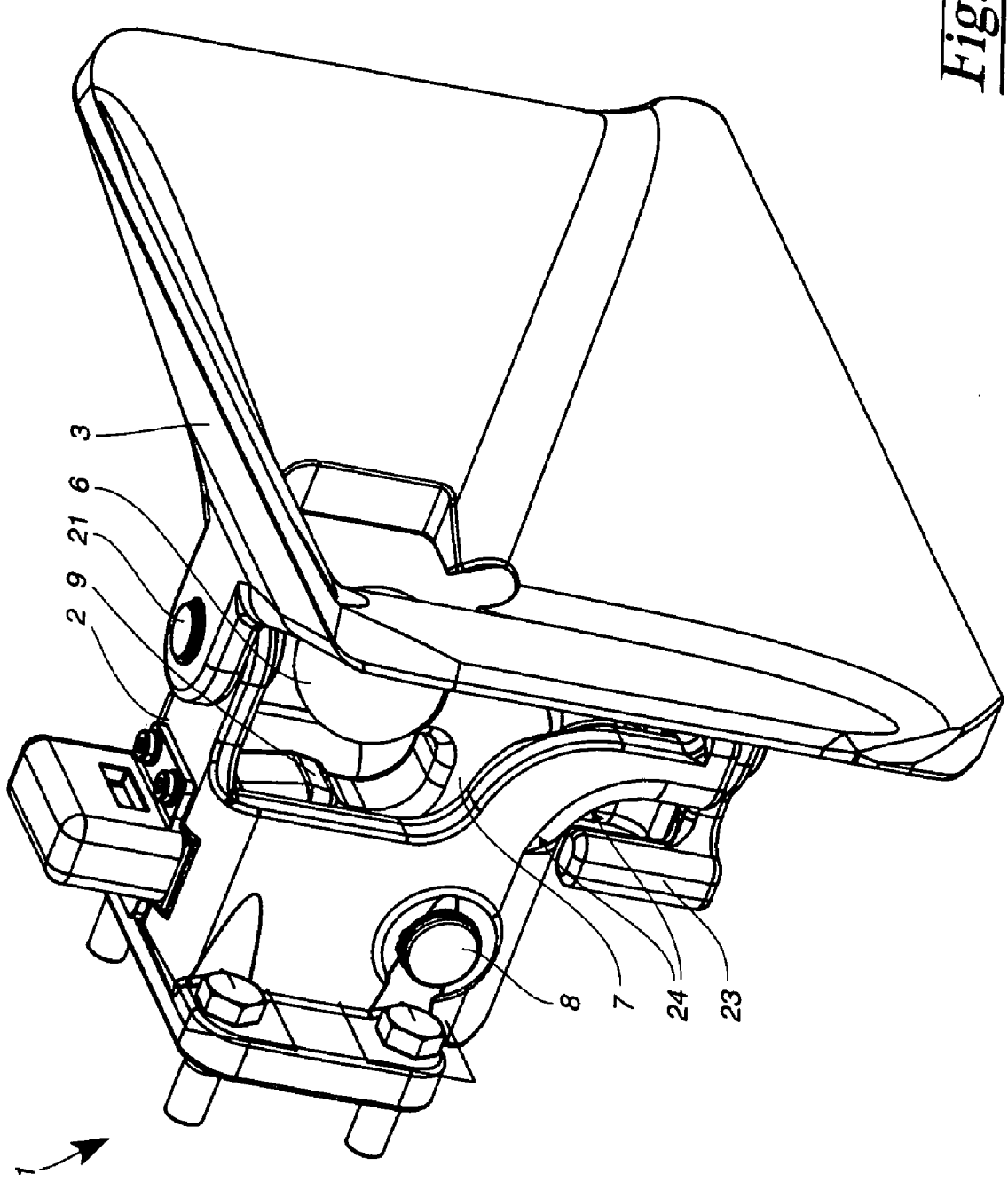

In the drawings:

FIG. 1 shows a cutaway illustration of a trailer coupling in the release position, FIG. 2 shows the trailer coupling according to FIG. 1 in the coupling position, FIG. 3 shows a sectional illustration through a second embodiment of a trailer coupling, and FIG. 4 shows a three-dimensional illustration of the trailer coupling according to FIG. 3.

A trailer coupling 1 has a housing 2 fixed on the vehicle. It is also envisaged, in principle, to support the housing 2 in a vertically displaceable manner on the towing vehicle in order to enable better adaptation to a trailer. The connection of the housing 2 to the vehicle or to a vertical-displacement device preferably takes place via a shank or screws, which are left out in the figures for the purpose of simplification. An intercepting mouth 3 which guides a drawbar 4 is integrally formed on the housing 2.

The drawbar 4 has a universal ball joint 5 which interacts with a ball head 6 arranged in the housing 2. This ball head 6 forms the coupling element 6 of the trailer coupling 1. The ball head 6 is fixed on a support 7 which is supported in the housing 2 in a manner such that it can pivot about an axis 8. A cam 9 is also provided on the support 7, said cam being displaced by the penetrating universal ball joint 5, with the support 7 being carried along. The effect achieved by this is that the horizontal movement of the universal ball joint 5 during introduction of the drawbar 4 into the coupling mouth 10 is converted into an essentially vertical movement of the coupling head 6. At the same time, the cam 9 slides along the outer surface of the universal ball joint 5 in order to set the required displacement paths for the coupling element 6. Thus, apart from introducing the drawbar 4 into the coupling mouth 10, the coupling operation does not require any further measures and takes place essentially automatically.

In order to keep the coupling element 6 in the release position illustrated in FIG. 1, the support 7 is prestressed into the release position by means of a compression spring 11. As an alternative or an addition, a tension spring (indicated in FIG. 2) may also be used. Furthermore, it is also envisaged to use a torsion spring (not illustrated) in the region of the axis 8 in order to prestress the support 7. The abovementioned springs may be used in simple or multiple form and also in combination with one another in order to obtain a construction of the trailer coupling 1 which is as compact as possible, together with high operational reliability.

In the housing 2 according to FIG. 2, a threaded hole 13, in which an adjusting screw 14 is screwed, is provided on the upper side. This adjusting screw 14 serves to manually set a play between the ball head 6 and the universal ball joint 5.

In order to retain the coupling element 6 in the coupling position illustrated in FIG. 2, the support 7 has a hole 15 in which a securing pin 16 can penetrate. This securing pin 16 is aligned with respect to the hole 15 in the coupling position illustrated in FIG. 2. In addition, the securing pin 16 is prestressed in an axially displaceable and resilient manner against the support 7, so that, in the coupling position, it penetrates the hole 15 and retains the support 7. An unintentional release of the coupling element 16 is therefore ruled out.

An alternative embodiment of the trailer coupling 1 is explained in more detail with reference to the two FIGS. 3 and 4, with identical reference numbers denoting the same parts. The description below is restricted to the differences from the embodiment previously described.

The support 7 has a depression 17 in the upper region, in which the securing pin 16 engages from above. The securing pin 16 can be displaced vertically and is pre-stressed against the support 7 by a spring 18. This results in a particularly compact construction of the trailer coupling 1. In order to eliminate the vertical play of the drawbar 4, a buffer 19 is provided in the housing 2 and presses from above against the universal joint 5. This buffer 19 consists of a rubber having a high Shore hardness, so that it can exert a permanent pressure against the universal joint 5.

The intercepting mouth 3 is held in a manner such that it can pivot about a vertical axis 20 in order to ensure sufficient pivotability of the trailer drawbar 4. For this purpose, the intercepting mouth 3 is supported on rotary joints 21 on the housing 2. In this case, the pivot axis 20 of the intercepting mouth 3 passes through the ball central point 22 when the latter is in the coupling position. This ensures optimum orientation of the intercepting mouth 3 during maneuvering of the vehicle.

Webs 23 which are directed upward toward the pivot axis 20 on the towing vehicle and which interact with the support 7 are provided on the intercepting mouth 3. The webs 23 and the support 7 have guide surfaces 24 which correspond to one another and, during pivoting of the support 7 into the release position, force the coupling mouth 3 into the neutral position illustrated.

Since some exemplary embodiments of the present invention are not shown or described, it should be understood that a multiplicity of changes and modifications to these exemplary embodiments which have been described is possible without departing from the essential concept and the extent of protection of the invention that is defined by the claims.

LIST OF REFERENCE NUMBERS

1 Trailer coupling
2 Housing
3 Intercepting mouth
4 Drawbar
5 Universal ball joint
6 Ball head
7 Support
8 Axis
9 Cam
10 Coupling mouth
11 Compression spring
12 Tension spring
13 Threaded hole
14 Adjusting screw
15 Hole
16 Securing pin
17 Depression

18 Spring
19 Buffer
20 Axis
21 Rotating joint
22 Ball central point
23 Web
24 Guide surface

The invention claimed is:

1. A trailer coupling for a vehicle, in particular a tractor, the trailer coupling having a ball head which can grasp a universal ball joint of a drawbar of a trailer and is displaceable between a coupling position and a release position, the ball head being fixed on a displaceable support which is connected fixedly to a cam, which can be actuated by the drawbar in order to displace the ball head into the coupling position and the support being prestressed resiliently counter to the coupling position.

2. The trailer coupling as claimed in claim 1, in which the support is supported pivotably.

3. The trailer coupling as claimed in claim 2, in which the support can be pivoted about an approximately horizontal axis.

4. The trailer coupling as claimed in claim 1, in which the support interacts with a displaceable securing pin which retains the support in the coupling position.

5. The trailer coupling as claimed in claim 4, in which the securing pin engages in a depression of the support essentially from above.

6. The trailer coupling as claimed in claim 4, in which the securing pin is positioned at an acute angle with respect to the direction of displacement of the securing pin.

7. The trailer coupling as claimed in claim 4, in which the securing pin is prestressed resiliently in the direction of the retaining locking position.

8. The trailer coupling as claimed in claim 1, in which, in order to reduce a coupling play, an adjusting screw can be pressed against the drawbar.

9. The trailer coupling as claimed in claim 1, in which, in order to reduce the coupling play, an elastic buffer can be pressed against the drawbar.

10. The trailer coupling as claimed in claim 1, in which an intercepting mouth is provided.

11. The trailer coupling as claimed in claim 9, in which the intercepting mouth is supported on a housing fixed on the vehicle.

12. The trailer coupling as claimed in claim 11, in which guide surfaces are provided on the intercepting mouth, said guide surfaces interacting with corresponding guide surfaces of the support and, during the displacement of the support into the release position, forcing the intercepting mouth into a neutral position.

* * * * *